United States Patent Office 2,786,008
Patented Mar. 19, 1957

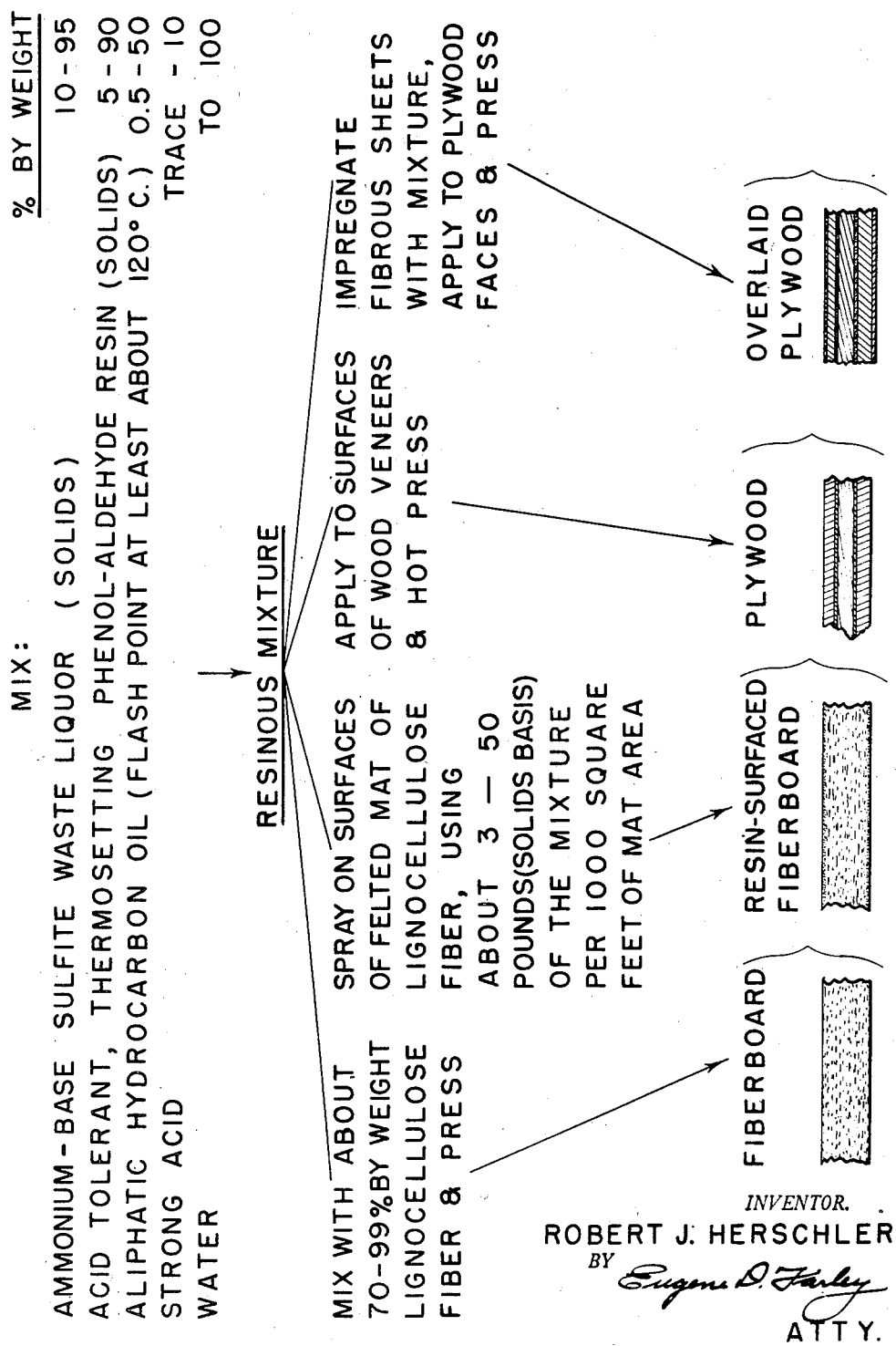

2,786,008

ACIDIC AMMONIUM-BASE SULFITE WASTE LIQUOR-PHENOL-ALDEHYDE RESINS, THEIR PRODUCTION AND APPLICATION

Robert J. Herschler, Camas, Wash., assignor to Crown Zellerbach Corporation, San Francisco, Calif., a corporation of Nevada Application April 13, 1953, Serial No. 348,545

25 Claims. (Cl. 154—132)

This invention relates to resins made from ammonium-base sulfite waste liquor and acid tolerant, thermosetting phenol-aldehyde resins, to the process for the production of such resins, and to their various applications such as in the manufacture of fiberboard, resin surfaced fiberboard, plywood and overlayed plywood.

Although a number of compositions including as constituents calcium-, magnesium-, or sodium-base sulfite waste liquor and a thermosetting phenol-aldehyde resin, heretofore have been developed, the application of these to such uses as binders or impregnants in the manufacture of fiberboard and plywood has been handicapped by several serious disadvantages. In the first place, since the constituents of sulfite waste liquor are soluble in water, this property is imparted at least in some degree to compositions comprising the sulfite waste liquor and a thermosetting phenol-aldehyde resin even after the compositions have been treated under pressure. As a consequence, fiberboard and plywood made using such a composition as their principal adhesive constituent are deficient in the important property of water resistance.

In the second place, the prior are compositions of sulfite waste liquor and phenol-aldehyde resin have yielded products which are not adequately resistant to basic materials such as aqueous sodium hydroxide or to organic solvents such as acetone or alcohol.

Thirdly, the presence of a major proportion of sulfite waste liquor in the phenol-aldehyde resinous compositions which have been known heretofore has increased the cure time of the compositions. Accordingly, a relatively long press period has been required which correspondingly increases the cost of the pressing operation.

In the fourth place, some of the prior art resinous compositions have been characterized by relatively poor flow properties. As is well known, when a resinous composition is to be molded it should flow rapidly during the initial stage of the pressing to completely fill out the mold. After it has done so, it should set rapidly before an opportunity has been afforded to saturate the filler component of the molding mixture. This achieves maximum strength in the molded product with minimum use of resin. This desirable result has been difficult to obtain, for example, when phenol-aldehyde resins have been employed as the only constituent of the compositions.

I now have discovered that the foregoing and other difficulties may be overcome by the use of a resinous composition comprising essentially ammonium-base sulfite waste liquor and an acid-tolerant, thermosetting phenol-aldehyde resin. When such a composition is employed in molding, or in the fabrication of fiberboard or plywood, the use of the ammonium-base sulfite waste liquor surprisingly not only does not degrade the properties of the composition and of the products made therefrom, as does calcium-base sulfite waste liquor, but actually improves these properties materially in several important respects.

Thus it imparts a high degree of water-, alkali-, acid-, and solvent-resistance to the molded or fabricated product. Also, it imparts a relatively fast cure time to the raw mixture during pressing or fabrication. Still further, it controls the flow properties of the mixture so that it flows rapidly during the initial stages of the pressing operation and then sets rapidly to a hard, infusible product. All of these results are obtained without impairing the appearance of the final product, using a raw material of very low cost.

Although the relative proportions of the ammonium-base sulfite waste liquor and the acid-tolerant, thermosetting phenol-aldehyde resin are variable to suit contemplated applications, the proportions given in Table I below indicate the general and preferred ranges of use.

TABLE I

| | General Range, Percent by Weight | Preferred Range, Percent by Weight |
|---|---|---|
| Ammonium-base sulfite waste liquor (solids) | 10–95 | 20–50 |
| Acid-tolerant phenol-aldehyde resin (solids) | 5–90 | 10–60 |
| Water | to 100 | to 100 |

The ammonium-base sulfite waste liquor which is a principal ingredient of the hereindescribed compositions is obtained as a waste product from the normal operation of the ammonium-base wood pulping process. It may be derived from the pulping of the wood of various species of coniferous and deciduous trees and of other lignocellulose plant materials. The western hemlock, Douglas fir, spruce, white fir, and certain of the pines are representative of suitable coniferous species. The aspen, alder, birch, maple and beech are representative of suitable deciduous species. Bagasse and straw are representative of other suitable lignocellulose plant materials. The liquor derived from the wood of the western hemlock is of particular interest because it provides a resinous product of good properties when mixed with a phenol-aldehyde resin and because it is readily available in large quantities as a by-product of commercial pulping operations.

During the pulping process, the wood chips are cooked under pressure with a liquor containing essentially ammonium bisulfite, sulfur dioxide and water. This dissolves the lignin from the wood to a greater or lesser degree, as well as the sugars and other water soluble constituents. The resulting sulfite waste liquor then is separated from the pulp. Although its composition is somewhat variable depending upon the pulping conditions and the wood species, its content of ammonium lignin sulfonates ranges generally between about 40% and about 70% by weight, on a dry basis, while the amount of sugars present ranges from about 10% to about 40% by weight, on a dry basis.

If desired, a desugared ammonium-base sulfite waste liquor may be employed in the preparation of the presently described resinous compositions. Such a liquor is one in which the sugar content has been substantially reduced by a subsequent processing operation. The content of ammonium lignin sulfonates in a typical desugared liquor ranges between about 50% and about 95% by weight on a dry basis.

A typical liquor resulting from the pulping of western hemlock with ammonium bisulfite contains about 10% solids having the composition given in Table II wherein the miscellaneous constituents comprise wood extractives, waxes, fatty acids, sterols, and the like.

TABLE II

| | Percent by weight total solids |
|---|---|
| Lignin sulphonic acids | 55.0 |
| Alkali-liberated ammonia | 3.0 |
| Reducing sugars as glucose | 17 |
| Sulfate | 2 |
| Sulfated ash | 2 |
| Miscellaneous | 21 |

Particularly suitable for the purposes of the present invention is the product obtained by concentrating ammonium-base sulfite waste liquor and sold by the Crown Zellerbach Corporation under the trade-name "Orzan." This product is commercially available in liquid form in a wide range of concentrations, a typical concentration being one having a total solids content of about 50%. It also is available as a spray dried powder.

The acid-tolerant, thermosetting phenol-aldehyde resin which may be used together with the ammonium-base sulfite waste liquor in formulating the presently described resinous compositions may be selected from a large group of materials belonging to this class. It is termed "acid-tolerant" because it is not precipitated from its aqueous solutions by the addition of acid. This is important because the ammonium-base sulfite waste liquor which is the other principal constituent of the hereindescribed compositions is acidic in character, having a pH of about 4. Consequently, unless the phenolic resin is acid-tolerant, the addition of the ammonium-base sulfite waste liquor to it would cause precipitation of the resin.

The acid-tolerant phenol-aldehyde resins are prepared by condensing the resin to the late A or early B stage. An agent then is added to remove the sodium ion. Such an agent may comprise, for example, oxalic acid. This forms sodium oxalate, the preponderance of which precipitates and may be removed by filtration. The resulting resin solution is acid-tolerant and suitable for the purposes of the present invention. The phenol-aldehyde resin may be derived from various phenols and aldehydes, illustrative phenols being phenol itself, the cresols, the xylenols, and the petroleum cresylic acids; and illustrative aldehydes being formaldehyde, acetaldehyde, and furfural. Preferred phenol-aldehyde resins, however, are the acid-tolerant, thermosetting condensation products of phenol and formaldehyde which are commercially available from a number of sources. These various phenol-aldehyde resins may be used singly or in combination with each other.

As auxiliary components of the resinous compositions described herein there may also be included an aliphatic hydrocarbon oil having a flash point of at least about 120° C. and a strong acid. When one or both of these two components are included, the compositions may have the relative proportions set forth in Table III below.

TABLE III

| | General Range, Percent by Weight | Preferred Range, Percent by Weight |
|---|---|---|
| Ammonium-base sulfite waste liquor (solids) | 10-95 | 20-50 |
| Acid-tolerant, thermosetting phenol-aldehyde resin (solids) | 5-90 | 10-60 |
| Aliphatic hydrocarbon oil (flash point at least about 120° C.) | 0.5-50 | 1-10 |
| Strong Acid | Trace—10 | 0.5-5.0 |
| Water | to 100 | to 100 |

The aliphatic hydrocarbon oil serves dual functions. First, it acts as a mold release compound which facilitates the release of the pressed product from the molds and metal cauls used in the press. Secondly, when the resinous product is used in the manufacture of pressed fibrous products such as paper-overlaid plywood and hardboard, the oil content imparts desirable surface qualities to these products. For example, the oil contained in paper-overlaid plywood forms a self-lubricating panel useful as concrete form material. Also, the oil contained in the surface of the hardboard manufactured by the presently described process acts as a tempering agent, increasing the hardness and resistance of the hardboard surface and eliminating the necessity of a separate post-press tempering or oiling operation, such as often is employed today in the hardboard art.

The aliphatic hydrocarbon oils which are suitable for the present purposes comprise in general the medium and high molecular weight aliphatic hydrocarbons having a flash point of at least about 120° C. These include, for example, many of the commercial mineral oils, paraffin oils, cylinder oils, and lubricating oils. The oil may be employed in amount sufficient to impart the desired qualities to the resinous mixture, amounts of from about 0.5% to about 50% by weight of the mixture on a solids basis being usually adequate. Preferred amounts in manufacturing resinous compositions suitable for use in making overlaid plywood or hardboard are from about 1% to about 10% by weight.

It has been discovered further that the set or cure of the herein-described resinous compositions may be very materially accelerated by the incorporation of a strong acid, i. e. an acid having a dissociation constant of more than about $1 \times 10^{-3}$. This effect is unique and specific for compositions including a thermosetting phenol-aldehyde resin and ammonium-base sulfite waste liquor. Neither component alone will react in this manner with a strong acid. It accelerates remarkably the cure of the resinous mixture, transforming it to one which is active at room temperature and which sets through an exothermic reaction, forming a solid, insoluble, nearly infusible resinous product in a short time.

Various of the strong acids may be employed to accelerate the setting of the compositions. As illustrative of suitable inorganic acids there may be cited hydrochloric acid, sulfuric acid, and phosphoric acid. Trichloracetic acid and p-toluenesulfonic acid are examples of strong organic acids suitable for the present purposes. A preferred acid, however, is ortho phosphoric acid because of the remarkably high degree of acceleration which it imparts to the setting of the resin and because of the smoothness of the reaction.

The amount of acid to be employed obviously is somewhat variable depending upon the identity of the acid and the character of the other constituents of the composition. In general, however, from a trace up to about 10% by weight is employed, a preferred range being between about 0.5% and about 5.0% by weight.

The manner of preparation of the hereindescribed resinous mixtures and their application to various uses are illustrated in the drawing which comprises a flow plan of the procedures employed.

In general, the mixtures are prepared by simply mixing together the various constituents in any suitable type of mixer at ordinary room temperature, under conditions calculated to secure their intimate admixture with each other. Then phenol-aldehyde resin, the ammonium-base sulfite waste liquor and the hydrocarbon oil may be added in any order. It is preferred, however, to add the acid, if any is employed, to either the waste liquor or to the mixture of the other ingredients. Where a hydrocarbon oil is employed, it preferably is added to the ammonium-base sulfite waste liquor and the two constituents mixed. In this way the constituents of the liquor act as emulsifying agents, insuring the uniform dispersion of the oil throughout the mixture.

The resinous mixture without added acid is relatively stable and has a pot life which is about as long as that of the phenol-aldehyde resinous constituent. It may be applied directly in any of its several applications. Thus it may be mixed with up to about 90% by weight of a suitable filler, such as wood flour, walnut shell flour, porous earths in powdered form, etc. and formed into molding compositions which then may be pressed into various objects in the usual manner.

The resinous mixture is also well suited, however, for use in the manufacture of fiberboard, resin-surfaced fiberboard, plywood and overlaid plywood. As is indicated in the drawing, in the manufacture of fiberboard the resinous mixture may be intimately mixed with from about 70% to about 99% by weight of lignocellulose fiber, prepared by defiberizing wood or other lignocellulose material in conventional manner.

The resulting composition then may be felted into a mat and pressed at a pressure sufficient to form either insulation board, semi-hardboard, or hardboard. The pressing conditions may be for example from about 50 to about 800 pounds per square inch at a temperature of from about room temperature to about 250° C. for a time of from about 1 minute to about 20 minutes.

In making a resin-surfaced fiberboard from the herein-described resinous mixtures a base material comprising lignocellulose fiber and a suitable resinous binder first is formed into a mat by a suitable felting procedure. The surface of the mat then is sprayed with a topical application of from about 3 to about 50 lbs. by weight on a solids basis of the presently described mixture per 1000 square feet of mat area, depending upon the thickness and density and composition of the mat. The mat then may be pressed under substantially the conditions described above for making a fiberboard product. The resulting resin-surfaced fiberboard has a smooth, glossy surface which is highly resistant to abrasion and to the action of various solvents and chemical reagents.

In making plywood using the presently described mixtures, a core veneer may be coated on both sides with the mixture after which it is placed between a pair of face veneers. The assembly then is introduced into a hot press and pressed at between about 100° C. and about 170° C. for from about 3 minutes to about 20 minutes at a pressure of between about 150 p. s. i. and about 250 p. s. i. This forms a firmly bonded, water-resistant plywood product.

In making overlaid plywood, fibrous sheets such as sheets of paper towelling may be impregnated with the presently described resinous mixture. The impregnated sheets then are placed either on the outside faces of plywood or on the outside faces of the face veneers of a plywood-fabricating assembly. The resulting assembly then is placed between the platens of a press and hot pressed under about the same conditions as those set forth above for making plywood. The resulting product comprises a plywood base having a hard, resistant, smooth, resinous surface useful for many purposes.

In addition to their uses in the production of molding compounds, fiberboard and plywood, the presently described resinous compositions may be employed to advantage in such industrial applications as impregnants of papers, fabrics or glass wool mats; bonding compositions for rock wool insulation and abrasive grit grinding wheels; binders for briquetting wood, coal, and the like; resins for brake linings; surface coatings; and as specialty resins.

The presently described resinous compositions and their application to various uses are further illustrated in the following examples wherein the proportions of the constituents of the mixture are given in percentages by weight on a solids basis.

Example 1

This example illustrates a typical resinous composition of the invention.

Ammonium-base sulfite waste liquor, acid-tolerant, thermosetting phenol-formaldehyde resin and cylinder oil were mixed thoroughly at room temperature in the following proportions:

| | Percent by weight |
|---|---|
| Waste liquor | 20 |
| Resin | 38 |
| Cylinder oil | 6 |
| Water | 36 |

The ammonium-base sulfite waste liquor was Orzan having a solids content of 50% by weight. The resin was an aqueous solution having a solids content of 70% by weight and sold under the trade-name of Resinox 468 by the Monsanto Chemical Company. The water was derived from the water content of the waste liquor and the resin. The cylinder oil was Tycol Atwater, Cylinder oil No. 83 (Tidewater Oil Company).

The pH of the resinous mixture was 4.2. It was suitable for use as an impregnant of paper to be used as a high density overlay for plywood and hardboard, and as an adhesive constituent for molding compositions and fiberboard.

Example 2

This example illustrates a resinous composition of the invention including a cylinder oil and a somewhat reduced proportion of phenol-aldehyde resin.

Ammonium-base sulfite waste liquor, acid-tolerant, thermosetting phenol-formaldehyde resin, cylinder oil and water were intimately mixed at room temperature in the following proportions:

| | Percent by weight |
|---|---|
| Waste liquor | 38 |
| Resin | 10 |
| Cylinder oil | 10 |
| Water | 42 |

The waste liquor was Orzan having a 50% solids content. The resin was Resinox 468 having a 70% solids content. The cylinder oil was Tycol Atwater Cylinder oil No. 83. The water was derived from the water content of the Orzan and the Resinox.

The resinous product had a pH value of 3.4. It was suitable for use as an excellent and economical topping for application prior to pressing of the mats from which soft board or semi-dense hardboards are made.

Example 3

This example illustrates one of the resinous compositions of this invention produced in the form of a paste.

Ammonium-base sulfite waste liquor and acid-tolerant, thermosetting phenol-formaldehyde resin and water were mixed at room temperature in the following proportion:

| | Percent by weight |
|---|---|
| Ammonium-base sulfite waste liquor | 76 |
| Phenol-formaldehyde resin | 14 |
| Water | 10 |

The waste liquor was Orzan having a solids content of about 95% while the resin was Resinox 468 having a 70% solids content. The water was derived from the aqueous content of the waste liquor and resin.

The product was a heavy paste having a pH value of 3.9. It was applicable as a molding composition, particularly when extended with inert fillers such as walnut shell flour, wood flour or mica, and also as a binder for briquetting.

Example 4

This example illustrates one of the presently described resinous compositions which includes strong mineral acid, i. e. phosphoric acid as an accelerator.

The constituents of the composition were as follows:

| | Percent by weight |
|---|---|
| Ammonium-base sulfite waste liquor | 28 |
| Phenol-formaldehyde resin | 27 |
| Phosphoric acid | 5 |
| Water | 40 |

The ammonium-base sulfite waste liquor was Orzan having a 50% solids content. The phenol-formaldehyde resin was Resinox 468 having a 70% solids content. The phosphoric acid was commercial phosphoric acid having an activity of 85%. The water was derived from the constituents of the composition.

In preparing the composition the phosphoric acid was added to the ammonium-base sulfite waste liquor and both materials thoroughly mixed together. The phenol-formaldehyde resin then was mixed in. The pH value of the resulting mixture was about 1.0. The composition set to a hard, friable solid at room temperature in less than an hour, and at correspondingly lower times at higher temperatures or with increased amount of acid. The setting reaction was exothermic.

The composition could be foamed with heat, inert gases or agitation. The solid product could be machined and otherwise processed. The resin thus was suitable for use particularly as a binder, and as a plugging agent or sealer for numerous materials.

*Example 5*

The following example illustrates the use of another strong mineral acid, hydrochloric acid, in the presently described resinous compositions.

The composition in this case consisted of the following constituents.

| | Percent by weight |
|---|---|
| Ammonium-base sulfite waste liquor | 28 |
| Thermosetting phenol-formaldehyde resin | 27 |
| Hydrochloric acid | 2 |
| Water | 43 |

The ammonium-base sulfite waste liquor was Orzan having a solids content of 50%. The resin was Resinox 468 having a solids content of 70%. The hydrochloric acid had a concentration of 37% HCl. The water was derived from the water content of these constituents.

In formulating the composition, the hydrochloric acid was added to the ammonium-base sulfite waste liquor and the resulting mixture thoroughly stirred. The phenol-formaldehyde resin then was mixed in. This procedure was effectuated at room temperature and the pH value of the final mixture was about 1.0. The formulation set to a hard, friable solid at room temperature in about an hour.

*Example 6*

This example illustrates the use of a strong, organic acid, trichloracetic acid in the formulation of the presently described compositions.

The composition in this case had the following constituents present:

| | Percent by weight |
|---|---|
| Ammonium-base sulfite waste liquor | 28 |
| Phenol-formaldehyde resin | 27 |
| Trichloroacetic acid | 6 |
| Water | 39 |

The ammonium-base sulfite waste liquor was Orzan having a 50% solids content. The phenol-formaldehyde resin was Resinox 468 having a 70% solids content. The water was derived from the water content of these two materials. In formulating the composition, the trichloroacetic acid was added to the sulfite waste liquor, the resulting mixture stirred thoroughly and the phenol-formaldehyde resin mixed in, these procedures being carried out at room temperature. The pH value of the resulting mixture was about 1.0. This formulation set to a hard, friable solid at room temperature in less than six hours.

*Example 7*

This example illustrates the application of the presently described compositions as a binder in manufacture of fiberboard.

The composition of Example 1 was mixed with wood fiber in the proportion of 2.25% resin to 97.75% wood fiber. The resulting mixture then was formed into a mat and pressed at 149° C. and 600 p. s. i. for 8 minutes. The resulting fiberboard had a density of 70.5 pounds per cubic foot. It had a strength (modulus of rupture) of 3300 pounds per square inch and a water absorption of 25% in 24 hours.

*Example 8*

This example illustrates the application of the presently described resinous composition in the production of resin-surfaced fiberboard.

A fibrous mixture comprising 98% wood fiber and 2% of a thermosetting phenol-formaldehyde resin was formed into a mat. The mat then was sprayed with the herein-described resinous composition of Example 2, using a topical application of about 20 pounds of the composition on a solids basis per 1000 square feet of mat area.

The surface-impregnated mat then was pressed at 600 p. s. i. and 149° C. for 9 minutes. The resulting product had a density of 68.7 pounds per cubic foot. It had a hard, impervious surface which was resistant to abrasion, as well as to the action of solvents and chemical reagents.

*Example 9*

This example illustrates the application of the presently described resinous compositions in the manufacture of plywood.

A resinous composition was prepared having the following constituents:

| | Percent by weight |
|---|---|
| Ammonium-base sulfite waste liquor | 23 |
| Phenol-formaldehyde resin | 37 |
| Water | 40 |

The ammonium-base sulfite waste liquor was Orzan having a 50% solids content. The phenol-formaldehyde resin was Resinox 468 having a 70% solids content. This resin was advanced to the late B stage at a temperature of 100° C. before it was mixed with the Orzan. The water was derived from the water content of the constituents of the mixture. Both constituents were mixed at room temperature. The pH value of the resulting mixture was 3.8.

A core wood veneer was coated with the resinous composition using an application of 80 pounds per 1000 square feet of double glue line. Face veneers then were applied and the resulting assembly hot pressed at 143° C. and 195 p. s. i. for 9 minutes. The resulting plywood product was strongly bonded. It also was strongly water resistant.

*Example 10*

This example illustrates the application of the presently described compositions in the manufacture of overlaid plywood.

First a resinous composition was prepared having the following constituents:

| | Percent by weight |
|---|---|
| Ammonium-base sulfite waste liquor | 22 |
| Phenol-formaldehyde resin | 36 |
| Turbine oil | 5 |
| Water | 37 |

The ammonium-base sulfite waste liquor was Orzan having a 50% solids content. The phenol-formaldehyde resin was Resinox 468 having a 70% solids content. The turbine oil was Deturbo oil #25, a product of the Standard Oil Company of California. The water was derived from the water content of the other constituents of the mixture.

Next a control composition was prepared having the same composition as the above except that calcium-base sulfite waste liquor having a solids content of 50% was substituted for the ammonium-base sulfite waste liquor. It was obtained as a by-product from pulp manufactured by the calcium-base sulfite process and concentrated to a solids content of 50% by weight.

The constituents of both compositions were mixed at room temperature. In both cases the pH value of the resulting mixture was 3.8. Absorbent sheets of paper towelling having an oven dry weight of 35 pounds per ream then were impregnated with each of the compositions to an oven-dry basis weight of 73 pounds per ream.

The sheets impregnated with the presently described resin and with the control resin were placed side by side on the same sheet of Douglas fir plywood and pressed at a pressure of 200 pounds per square inch and a temperature of 300° F. for 7 minutes. A comparative evaluation of the physical and chemical properties of the two products then was obtained using the conventional tests employed in the evaluation of plywood. The results were as follows:

| | Product containing ammonium-base sulfite waste liquor | Product containing calcium-base sulfite waste liquor |
|---|---|---|
| Boil resistance | Excellent | Poor. |
| Acid resistance | Excellent | Good. |
| Resistance to 10% caustic soda solution | Good | Poor. |

From the foregoing it will be apparent that by the presently described invention I have developed a resinous composition characterized by many significantly advantageous properties. It is versatile, being applicable in the preparation of a wide variety of impregnated and bonded products. It forms products which are highly resistant to the action of water, as well as to the action of solvents and chemical reagents such as acids and alkalies. It imparts superior flow properties to molding compositions in which it is contained. It has an accelerated cure rate for a given level of bonding.

Also, it forms products of improved appearance. By the incorporation of an acid, such as phosphoric acid, its setting properties may be accelerated to the point where it cures at ordinary room temperature. All of these advantages are obtained, furthermore, using a material which is very low in cost, and which heretofore has been considered a waste by-product of the pulping industry, namely, ammonium-base sulfite waste liquor.

Having described my invention in preferred embodiments, I claim:

1. The resinous composition comprising essentially acidic ammonium-base sulfite waste liquor resulting from pulping lignocellulose with an aqueous solution including ammonium bisulfite and an aqueous solution of an acid-tolerant, thermosetting phenol-aldehyde resin.

2. The resinous composition comprising in percent by weight:

Acidic ammonium-base sulfite waste liquor (solids basis) resulting from pulping lignocellulose with an aqueous solution including ammonium bisulfite _____ 10–95
Aqueous solution of an acid-tolerant thermosetting phenol-tidehyde resin (solids basis) _____ 5–90
Water _____ to 100

3. The resinous composition comprising in percent by weight:

Acidic ammonium-base sulfite waste liquor (solids basis) resulting from pulping lignocellulose with an aqueous solution including ammonium bisulfite _____ 20–50
Aqueous solution of an acid-tolerant thermosetting phenol-aldehyde resin (solids basis) _____ 10–60
Water _____ to 100

4. The resinous composition comprising in percent by weight:

Acidic ammonium-base sulfite waste liquor (solids basis) resulting from pulping lignocellulose with an aqueous solution including ammonium bisulfite _____ 10–95
Aqueous solution of an acid-tolerant thermosetting phenol-formaldehyde resin (solids basis) _____ 5–90
Water _____ to 100

5. The resinous composition comprising in percent by weight:

Acidic ammonium-base sulfite waste liquor (solids basis) resulting from pulping lignocellulose with an aqueous solution including ammonium bisulfite _____ 10–95
Aqueous solution of an acid-tolerant thermosetting phenol-aldehyde resin (solids basis) _____ 5–90
Aliphatic hydrocarbon oil (flash point at least about 120° C.) _____ 0.5–50
Water _____ to 100

6. The resinous composition comprising in percent by weight:

Acidic ammonium-base sulfite waste liquor (solids basis) resulting from pulping lignocellulose with an aqueous solution including ammonium bisulfite _____ 10–95
Aqueous solution of an acid-tolerant thermosetting phenol-aldehyde resin (solids basis) __ 5–90
Strong acid _____ Trace–10
Water _____ to 100

7. The resinous composition of claim 6 wherein the strong acid is phosphoric acid.

8. The process of making a water- and alkali-resistant resinous composition which comprises forming a mixture comprising essentially acidic ammonium-base sulfite waste liquor resulting from pulping lignocellulose with an aqueous solution including ammonium bisulfite and an aqueous solution of acid-tolerant, thermosetting phenol-aldehyde resin, adjusting the temperature of the mixture to a level at which the sulfite waste liquor and the phenol-aldehyde resin are reactive toward each other, and maintaining the mixture at such temperature until the reaction between the sulfite waste liquor and the phenol-aldehyde resin is substantially complete.

9. The process of making a water- and alkali-resistant resinous composition which comprises forming a mixture comprising the following constituents, in percent by weight:

Acidic ammonium-base sulfite waste liquor (solids basis) resulting from pulping lignocellulose with an aqueous solution including ammonium bifite _____ 10–95
Aqueous solution of an acid-tolerant thermosetting phenol-aldehyde resin (solids basis) _____ 5–90
Water _____ to 100 adjusting the temperature of the mixture to a level at which the sulfite waste liquor and the phenol-aldehyde resin are reactive toward each other, and maintaining the mixture at such temperature until the reaction between the sulfite waste liquor and the phenol-aldehyde resin is substantially complete.

10. The process of making a water- and alkali-resistant resinous composition which comprises forming a mixture comprising the following constituents, in percent by weight:

| | |
|---|---|
| Acidic ammonium-base sulfite waste liquor (solids basis) resulting from pulping lignocellulose with an aqueous solution including ammonium bisulfite | 20–50 |
| Aqueous solution of an acid-tolerant thermosetting phenol-aldehyde resin (solids basis) | 10–60 |
| Water | to 100 | adjusting the temperature of the mixture to a level at which the sulfite waste liquor and the phenol-aldehyde resin are reactive toward each other, and maintaining the mixture at such temperature until the reaction between the sulfite waste liquor and the phenol-aldehyde resin is substantially complete.

11. The process of making a water- and alkali-resistant resinous composition which comprises forming a mixture comprising the following constituents, in percent by weight:

| | |
|---|---|
| Acidic ammonium-base sulfite waste liquor (solids basis) resulting from pulping lignocellulose with aqueous solution including ammonium bisulfite | 10–95 |
| Aqueous solution of an acid-tolerant thermosetting phenol-formaldehyde resin (solids basis) | 5–90 |
| Water | to 100 | adjusting the temperature of the mixture to a level at which the sulfite waste liquor and the pehnol-aldehyde resin are reactive toward each other, and maintaining the mixture at such temperature until the reaction between the sulfite waste liquor and the phenol-formaldehyde resin is substantially complete.

12. The process of making a water- and alkali-resistant resinous composition which comprises forming a mixture comprising the following constituents, in percent by weight:

| | |
|---|---|
| Acidic ammonium-base sulfite waste liquor (solids basis) resulting from pulping lignocellulose with aqueous solution including ammonium bisulfite | 10–95 |
| Aqueous solutions of an acid-tolerant, thermosetting phenol-aldehyde resin (solids basis) | 5–90 |
| Aliphatic hydrocarbon oil (flash point at least about 120° C.) | 0.5–50 |
| Water | to 100 | adjusting the temperature of the mixture to a level at which the sulfite waste liquor and the phenol-aldehyde resin are reactive toward each other, and maintaining the mixture at such temperature until the reaction between the sulfite waste liquor and the phenol-aldehyde resin is substantially complete.

13. The process of making a water- and alkali-resistant resinous composition which comprises forming a mixture comprising the following constituents, in percent by weight:

| | |
|---|---|
| Acidic ammonium-base sulfite waste liquor (solids basis) resulting from pulping lignocellulose with aqueous solution including ammonium bisulfite | 10–95 |
| Aqueous solution of an acid-tolerant, thermosetting phenol-aldehyde resin (solid basis) | 5–90 |
| Strong acid | Trace–10 |
| Water | to-100 | adjusting the temperature of the mixture to a level at which the sulfite waste liquor and the phenol-aldehyde resin are reactive toward each other, and maintaining the mixture at such temperature until the reaction between the sulfite waste liquor and the phenol-aldehyde resin is substantially complete.

14. The process of claim 13 wherein the strong acid is phosphoric acid.

15. The method of making adhesively united, composite, fibrous products which comprises applying to pieces of fibrous material a resinous composition comprising essentially acidic ammonium-base sulfite waste liquor resulting from pulping lignocellulose with aqueous solution including ammonium bisulfite and an aqueous solution of an acid-tolerant, thermosetting phenol-aldehyde resin, applying pressure to the resulting mixture, and maintaining the mixture under pressure until the resinous component thereof has set, binding the fibrous pieces together to form the adhesively united composite product.

16. The composite product comprising pieces of fibrous material adhesively united by means of a resinous composition comprising essentially acidic ammonium-base sulfite waste liquor resulting from pulping lignocellulose with aqueous solution including ammonium bisulfite and an aqueous solution of an acid-tolerant, thermosetting phenol-aldehyde resin.

17. The method of making fiberboard which comprises applying to small pieces of lignocellulose a resinous composition comprising essentially acidic ammonium-base sulfite waste liquor resulting from pulping lignocellulose with aqueous solution including ammonium bisulfite and an aqueous solution of an acid-tolerant, thermosetting phenol-aldehyde resin, forming the resulting mixture into a mat, applying pressure to the mat, and maintaining the mat under pressure until the resinous component thereof has set, binding the lignocellulose pieces together to form the fiberboard product.

18. The fiberboard product comprising consolidated pieces of lignocellulose adhesively united by means of a resinous composition comprising essentially acidic ammonium-base sulfite waste liquor resulting from pulping lignocellulose with aqueous solution including ammonium bisulfite and an aqueous solution of an acid-tolerant, thermosetting phenol-aldehyde resin.

19. The method of making resin-surfaced fiberboard which comprises forming a mixture of pieces of lignocellulose and an adhesive material, forming the mixture into a mat, applying to the surface of the mat a resinous composition comprising essentially acidic ammonium-base sulfite waste liquor resulting from pulping lignocellulose with aqueous solution including ammonium bisulfite and an aqueous solution of an acid-tolerant, thermosetting phenol-aldehyde resin, applying pressure to the resulting treated mat and maintaining the mat under pressure until its adhesive and resinous components have set, thereby forming as a product a resin-surfaced fiberboard.

20. Resin surfaced fiberboard comprising consolidated pieces of lignocellulose adhesively united together, the face surfaces of the fiberboard being impregnated with a set resinous composition comprising essentially acidic ammonium-base sulfite waste liquor resulting from pulping lignocellulose with aqueous solution including ammonium bisulfite and an aqueous solution of an acid-tolerant, thermosetting phenol-aldehyde resin 21. The method of making plywood which comprises applying to the surfaces of wood veneers a resinous composition comprising essentially acidic ammonium-base sulfite waste liquor resulting from pulping lignocellulose with aqueous solution including ammonium bisulfite and an aqueous solution of an acid-tolerant, thermosetting phenol-aldehyde resin, assembling the veneers, and pressing the resulting assembly to set the resinous composition and bond the veneers together to form the plywood product.

22. Plywood comprising wood veneers adhesively united by means of a resinous composition comprising essentially acidic ammonium-base sulfite waste liquor resulting from pulping lignocellulose with aqueous solution including ammonium bisulfite and an aqueous solution of an acid-tolerant, thermosetting phenol-aldehyde resin.

23. The method of making an overlaid plywood product which comprises impregnating fibrous sheets with a resinous composition comprising essentially acidic ammonium-base sulfite waste liquor resulting from pulping lignocellulose with aqueous solution including ammonium bisulfite and an aqueous solution of an acid-tolerant, thermosetting phenol-aldehyde resin, applying at least one of the resulting impregnated sheets to at least one surface of a piece of plywood, and pressing the resulting assembly to set the resinous composition and bond the fibrous sheets to the plywood.

24. The overlaid plywood product comprising a piece of plywood having adhesively united to at least one surface thereof a sheet of fibrous material impregnated with a resinous composition comprising acidic ammonium-base sulfite waste liquor resulting from pulping lignocellulose with aqueous solution including ammonium bisulfite and an aqueous solution of an acid-tolerant, thermosetting phenol-aldehyde resin.

25. The self-lubricating concrete form plywood product comprising a plywood panel having adhesively united to at least one surface thereof a sheet of fibrous material impregnated with a resinous composition comprising acidic ammonium-base sulfite waste liquor resulting from pulping lignocellulose with aqueous solution including ammonium bisulfite, an aqueous solution of an acid-tolerant, thermosetting phenol-aldehyde resin, and an aliphatic hydrocarbon oil having a flash point of at least about 120° C.

References Cited in the file of this patent

UNITED STATES PATENTS

| | | |
|---|---|---|
| 2,099,717 | Alles | Nov. 23, 1937 |
| 2,148,893 | Bauer | Feb. 28, 1939 |
| 2,159,411 | Wallace | May 23, 1939 |
| 2,196,277 | Schorger et al. | Apr. 9, 1940 |
| 2,242,601 | Wallace | May 20, 1941 |
| 2,283,820 | Schorger et al. | May 19, 1942 |
| 2,379,889 | Dorland et al. | July 10, 1945 |
| 2,606,138 | Welch | Aug. 5, 1952 |
| 2,683,706 | Muller | July 13, 1954 |

FOREIGN PATENTS

| | | |
|---|---|---|
| 528,922 | Great Britain | Nov. 11, 1940 |